(No Model.)

W. L. SILVEY.
PROCESS OF MAKING SECONDARY BATTERY PLATES.

No. 512,757. Patented Jan. 16, 1894.

WITNESSES—
John Kirby Jr
H. S. Miller

INVENTOR—
William L. Silvey

UNITED STATES PATENT OFFICE.

WILLIAM L. SILVEY, OF DAYTON, OHIO.

PROCESS OF MAKING SECONDARY-BATTERY PLATES.

SPECIFICATION forming part of Letters Patent No. 512,757, dated January 16, 1894.

Application filed September 12, 1892. Serial No. 445,636. (No specimens.)

*To all whom it may concern:*

Be it known that I, WILLIAM L. SILVEY, a citizen of the United States, and a resident of Dayton, in the county of Montgomery and State of Ohio, have invented a certain new and useful Process of Making Secondary-Battery Plates, of which the following is a specification.

My invention relates to a new process of making battery plates, elements or electrodes, adaptable as the negative or hydrogen element of primary batteries, and as both oxygen and hydrogen element of so called secondary batteries, and it is the object of my present invention to produce a process which for efficiency and simplicity is far superior to all processes heretofore proposed for making secondary battery elements, both as to economy of time and material required, and as to their ultimate storage capacity.

The invention further relates to a method of preparing secondary battery electrodes by electrolytically preparing coating or combining suitable plates, with electrolytically decomposed and electrolytically deposited active material, in contradistinction to the Faure and Brush methods of procuring active material, (as red lead or litharge,) then mechanically applying it to a suitable support plate, and to the well known Planté process of oxidizing and deoxidizing the plates themselves by charging them repeatedly in a reverse direction.

Figure 1:
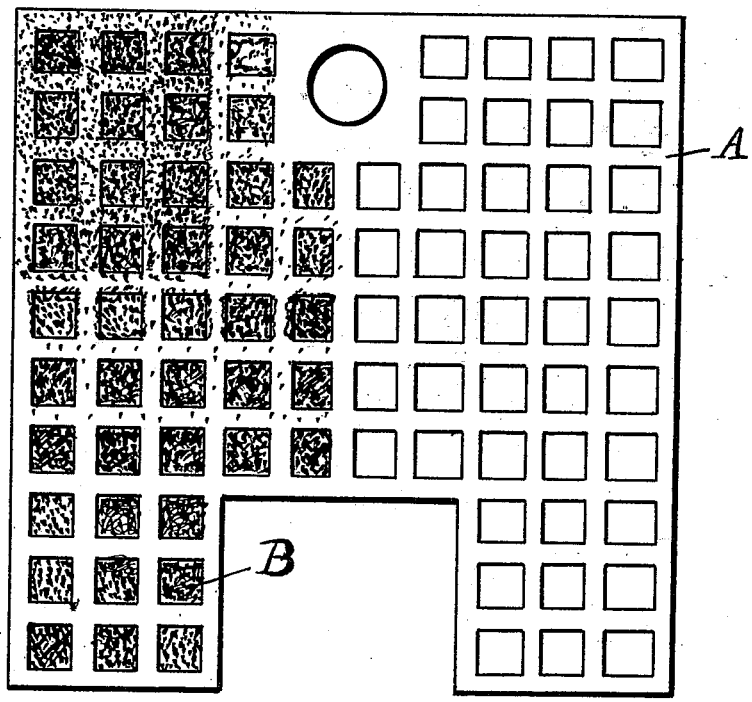
Figure 2:
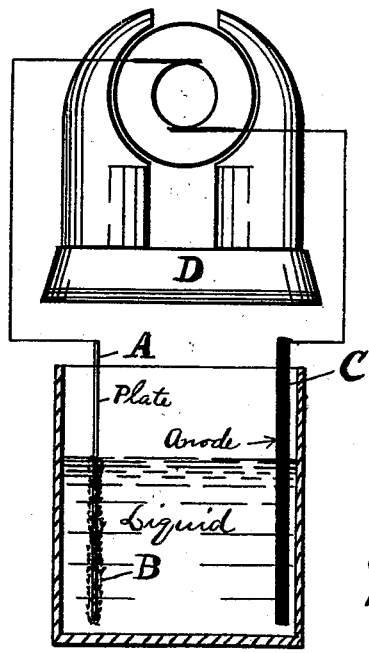

Referring to the accompanying drawings which are made a part hereof, in which similar letters of reference refer to similar parts throughout, Figure 1, represents one style of a grid or battery plate A, having the active material B, applied to one part of it according to my improved process, and Fig. 2, represents one way of employing my improved process in the production of battery plates, elements or electrodes, in which D represents a dynamo electric generator or other suitable source of electric power, from which electric conductors are carried to a suitable containing vat or rather vessel, containing liquid into which I now introduce a suitable conductor A, which may be a grid, rod, frame, wire, cloth, tube, shell, sheet, casting, forging, or any other convenient form to which the active material for a battery plate may be collected by electrolytic deposition and whereby a battery plate element or electrode may thus be formed.

In carrying my invention into effect I first procure a suitable containing vessel, into which I now pour or mix water, aqua ammonia and acetic acid or vinegar, the proper proportion being best determined by measure owing to the wide difference of the liquids in specific gravity, but I have found that a solution of two per cent. to twenty-five per cent. of aqua ammonia sand, two per cent. to twenty-five per cent. of acetic acid or vinegar, to which may be added some other alkali, as for instance sodium and lithium hydrate, the remainder being water, will give the best results. I have found in practice that a chloride of ammonia or other ammonia salts solution may be used instead of the aqua ammonia, but the chlorine tends to produce a white deposition, which is more or less detrimental to the proper performance of the work, and I have found in practice that all chlorides are detrimental to the performance of secondary or storage batteries. The proportion of the aqua ammonia, vinegar, and water will determine the vigor of action.

Having prepared my solution as before described, I now immerse my battery plates, electrodes or conductors in this solution, connecting them with one pole of a dynamo electric machine or other suitable source of electric power by suitable conductors, and at the same time I hang or otherwise dispose a mass of lead as an anode and connect it by proper conductors with the other pole of the dynamo machine or electric generator.

The solution having been properly made, and the battery plates and anodes properly connected with the source of electric supply having a sufficient electro motive force to overcome the internal resistance of the liquid, the anode will be found to be rapidly broken down in the vinegar or acetic acid solution and deposited in a spongy crystalline mass on the plate which is to become the plate of the new battery. Vinegar alone is not suitable as a conducting liquid, owing to the large quantity of carbonate of lead, which would invariably be formed owing to the large quantity of carbon in the form of carbonic acid gas in the atmosphere and which would be taken up into a solution forming with the vinegar, carbonate of lead. At the same time the solution would have a very high internal resistance. In order to overcome these objectionable features, the aqua ammonia is introduced into the solution, whereby the internal resistance of the liquid is greatly reduced, the ammonia at the same time preventing to a large extent the formation of lead oxide. The particles of lead are deposited on the battery plate or cathode, as fast as the anode is broken down. All solutions of a salt of the alkaline metal ammonium may be employed in this solution, but I have been able to obtain the best results with aqua ammonia, which in itself is an excellent reagent possessing large quantities of both hydrogen and nitrogen, the formula being $NH_3$. The ammonia serves to prevent almost entirely any formation of the carbonate and oxide of lead already referred to. By this process of disintegrating an anode and depositing the minute particles of lead onto a suitable battery plate while in the presence of a solution of a salt of the alkaline metal ammonium, I am enabled to produce ready formed hydrogen or negative plates in less than five hours, having as large or larger storage capacity than a battery plate having a filling of red lead or litharge. Besides I am enabled to make my plates in large numbers at a very moderate cost, as I use only crude material from which to make the active material of my battery, whereas in the Brush and Faure and all other secondary batteries having a mechanically filled plate, an expensive oxide of lead must be employed. Besides, with all such plates it will take from thirty to fifty hours to form the plates after they have been filled, while the negative plate to be used as the negative of my battery, by reason of the combination of hydrogen with lead is formed, as soon as the active material is deposited, and the oxygen or positive element is formed in about the same time as the mechanically filled plate.

Having prepared my plates by depositing upon them the required amount of spongy lead, I now take them out of the solution and remove as much of the solution as can be conveniently done, to prevent waste, and consolidate the deposit into a more compact uniform mass, either by running them and through a set of rolls, or by a sufficient amount of pressure, and having assembled them into a suitable number and proper arrangement to constitute a battery, having positive and negative electrodes, now introduce them into a solution of sulphuric acid and water, and form them in the usual manner for forming secondary batteries.

It will be observed that this process is a radical departure from the well known Planté process of preparing battery plates by the disintegration of the plates themselves aided by repeated reversals of the positive and negative electrodes, and also of the well known Brush and Faure processes wherein the active material is mechanically applied to the plates before submitting them to the electric current, whereas in my battery the active material is prepared and deposited principally by electrical means and is therefore less liable to contain impurities, and is in the very best possible shape and condition to receive and contain large quantities of electrical energy.

Having described my improved process, what I claim as new, and wish to secure by Letters Patent in the United States, is embodied in the following claims:

1. The process of making secondary battery plates which consists in immersing anodes of lead or lead alloy and cathodes of lead in a solution of ammonia and an acid, then disintegrating the anodes by the aid of an electric current and electrically depositing the parts thus decomposed into holes in the cathode.

2. The process of making secondary battery plates which consists in immersing anodes of lead or lead alloy and cathodes in a solution of ammonia and an acid which is a solvent for lead, then disintegrating the anodes by the aid of an electric current, and electrically depositing the part thus decomposed onto the cathode and then subjecting the cathodes to pressure.

3. The process of making secondary battery plates which consists in submerging an anode and cathode in a solution of ammonia and an acid, disintegrating the anode therein electrically and electrically transferring the part disintegrated to the cathode and depositing it thereon, then removing the cathode into a solution of sulphuric acid and water and forming them by the passage of an electric current.

4. The process of making secondary battery plates which consists in immersing plates of lead or lead alloy in a solution of an acid which is a solvent for lead, and ammonia, charging the plates in this solution by an electric current then placing them into a solution of sulphuric acid and charging them by an electric current.

5. The process of making perforated plate battery electrodes which consists in immersing the electrodes in a solution containing a combination of an acid which is a solvent for lead, and ammonia, decomposing lead plates in this solution, and converting them into spongy lead, then removing the perforated plates from the decomposing solution into a solution containing sulphuric acid and charging them with an electric current.

6. The process of making battery plates elements or electrodes which consists in placing suitable anodes and cathodes of lead or lead alloy in an electrolytic solution containing aqua ammonia and an acid which is a solvent for lead, then disintegrating the anode electrolytically and depositing it by the aid of an electric current onto the cathode and afterward charging the electrodes in a solution of sulphuric acid and water.

In testimony whereof I have set my hand in the presence of two subscribing witnesses.

WILLIAM L. SILVEY.

Witnesses:
H. S. MILLER,
G. M. WEAVER.